March 9, 1971  J. C. KOCI ET AL  3,568,332
SIMULATED DRIVING APPARATUS

Filed March 12, 1970  5 Sheets-Sheet 1

INVENTORS
JERRY C. KOCI &
ALBERT L. SCHLAPA
BY Edward C. Threedy
THEIR ATTORNEY.

INVENTORS.
JERRY C. KOCI &
ALBERT L. SCHLAPA
BY Edward C. Sheedy
THEIR ATTORNEY.

March 9, 1971  J. C. KOCI ET AL  3,568,332

SIMULATED DRIVING APPARATUS

Filed March 12, 1970  5 Sheets-Sheet 3

INVENTORS
JERRY C. KOCI &
ALBERT L. SCHLAPA
BY Edward C. Threedy
THEIR ATTORNEY.

March 9, 1971  J. C. KOCI ET AL  3,568,332
SIMULATED DRIVING APPARATUS
Filed March 12, 1970  5 Sheets-Sheet 4

INVENTORS.
JERRY C. KOCI &
ALBERT L. SCHLAPA
BY Edward C. Hrudy.
THEIR ATTORNEY.

March 9, 1971   J. C. KOCI ET AL   3,568,332
SIMULATED DRIVING APPARATUS
Filed March 12, 1970   5 Sheets-Sheet 5

INVENTORS.
JERRY C. KOCI &
ALBERT L. SCHLAPA
BY Edward C. Threedy
THEIR ATTORNEY _United States Patent Office_  
3,568,332  
Patented Mar. 9, 1971

1

3,568,332  
SIMULATED DRIVING APPARATUS  
Jerry C. Koci, Barrington, Ill., and Albert L. Schlapa, Fort Atkinson, Wis., assignors to Chicago Dynamic Industries, Inc., Chicago, Ill.  
Filed Mar. 12, 1970, Ser. No. 18,923  
Int. Cl. A63f 9/14; G09b 9/04  
U.S. Cl. 35—11          8 Claims

ABSTRACT OF THE DISCLOSURE

An apparatus for producing upon a screen an illusion of a panoramic roadway and simulated vehicle images moving competitively thereover as well as a steerable simulated vehicle image under the control of an operator of the apparatus. These images are created by a light source projected through a plurality of rotating transparent discs, with the images movable in response to the speed and direction of rotation of the discs as well as the movement of the light source relative thereto, all of which movements are under the control of the operator, thus testing and training the operator's coordination and reflex actions.

SUMMARY OF THE INVENTION

A cabinet-contained apparatus including a viewing screen upon which is projected the illusion of a changing panoramic roadway visible to the operator of the apparatus who has under his control, instruments by which he can control the speed and direction of movement of simulated vehicles moving over the roadway. The illusion of the roadway and the operator's vehicle as well as other vehicles moving independently over the roadway, is created by projecting a light source upon a representation of the operator's driven vehicle as well as through a plurality of rotating transparent discs, with the movement of the light source and the speed and direction of rotation of the discs under the control of the operator. A simulated steering wheel controls the movement of the light source as well as the representation of the vehicle being driven by the operator. An accelerator controls the speed and direction of rotation of the plurality of transparent discs so as to create the illusion of varying speeds between the operator's driven vehicle and the other vehicle images competing for movement over the roadway.

An electric circuit includes a stylus movable over a printed circuit so as to control the operation of the apparatus. The rotation of the discs is achieved through the employment of a number of motors, certain of which are shaded pole, four-cycle A.C. gear motors, with the energization of these motors determined by variable resistors connected across opposite coils of the motors, affecting the speed and direction of rotation thereof. The direction of rotation of the discs is important so as to create the illusion of acceleration and deceleration of the operator's driven vehicle relative to the roadway and other vehicle images appearing thereon. The discs carrying such images must be rotatable in either direction to create the proper and desirable illusion of movement.

The present invention is an improvement over that disclosed and claimed in the copending patent application, Ser. No. 864,750 filed Oct. 8, 1969. In such prior application, only one rotatable transparent disc was employed and only the illusion of the operator's vehicle was created and was subject to controlled movement over a panoramic roadway. In the present invention, through the use of a plurality of discs and associated control instruments, we have created the illusion of a plurality of moving vehicles, each appearing to have controlled independent movement over the roadway.

2

GENERAL DESCRIPTION

The objects of this invention are achieved through the preferred embodiment shown in the accompanying drawings, in which.

The invention is embodied within a cabinet 10 which includes a transparent viewing screen 11, a steering wheel 12, and an accelerator pedal 13.

Figure 2:
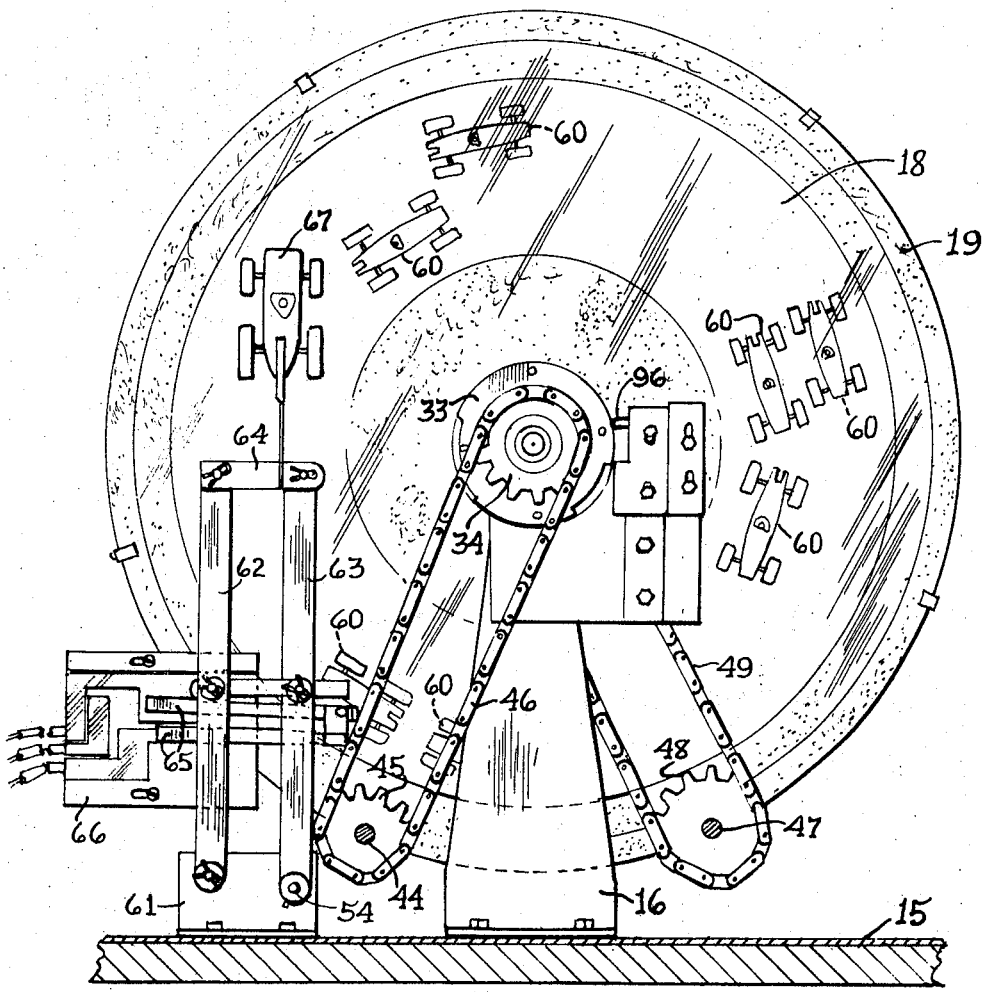
FIG. 2 is a side elevational view of certain of the instrumentalities by which the desired illusions are created.
Figure 6:
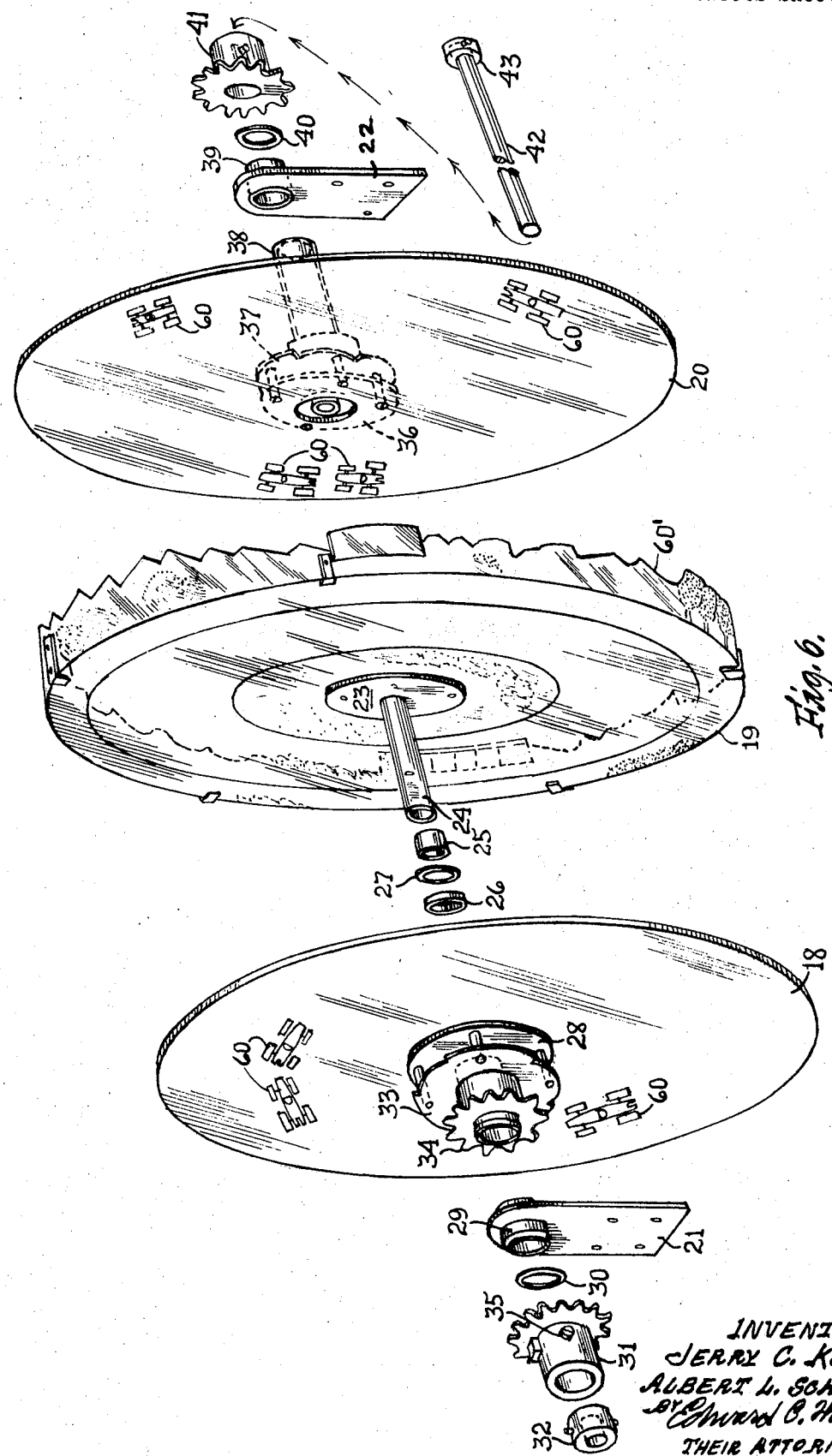
FIG. 6 is a perspective view of the rotatable transparent discs, shown in exploded relationship.

Within the base 14 of the cabinet 10 is mounted a base plate 15. Connected to the base plate 15 in spaced parallel relation are uprights 16 and 17 (see FIGS. 2 and 3). The transparent discs 18, 19 and 20 (FIG. 6) are mounted in coplanar spaced relationship for independent rotatable movement about a common axis. To achieve this arrangement, there are provided bearing plates 21 and 22 which are mounted on the free upper ends of the uprights 16 and 17. These bearing plates will in turn support the shaft structures which rotatably support the discs. The middle disc 19 is provided with a center hub 23 and has extending therefrom an elongated hollow sleeve 24 upon which are mounted spacers 25 and 26 and a washer 27.

The hollow sleeve 24 is adapted to be projected through the center hub 28 of the end disc 18 as well as through the bearing 29 of the bearing plate 21, a washer 30, and a sprocket collar 31.

It should be noted that the center hub 28 of the disc 18 includes as a part thereof a circular cam plate 33 and a sprocket wheel 34. The hub 28 of the disc 18 is freely journaled on the hollow sleeve 24 of the middle disc 19 so as to be freely rotatable thereabout. The sprocket collar 31 is in turn fixedly connected by a set screw 35 to the sleeve 24 for rotation therewith in a manner hereinafter described.

The rear disc 20 provides a center hub plate 36 which includes a circular cam plate 37 as well as a hollow sleeve 38 which extends in a direction opposite to that of the hollow sleeve 24 of the disc 19. The hollow sleeve 38 of the disc 20 projects through the bearing 39 of the bearing plate 22 through a washer 40 and a sprocket collar 41. A shaft 42 is of a length to be projected through the aligned center opening of the assembled disc structure hereinbefore described, with a locking washer 32 secured to one end thereof and a like locking washer 43 secured to the opposite end, so as to hold all of the discs 18, 19 and 20 in coplanar relationship and free to rotate independently with respect to each other.

An electric motor (not shown) has a rotatable shaft 44 (FIG. 2) connected to a sprocket wheel 45, which sprocket wheel 45 is in turn by an endless chain 46 connected to the sprocket collar 31 fixedly mounted on the hollow sleeve 24 of the disc 19. By this arrangement, when the shaft 44 is rotated, it will through the sprocket and chain arrangement rotate the disc 19.

A second motor which is preferably a shaded pole, four coil A.C. motor (not shown) has a rotatable shaft 47 carrying a sprocket wheel 48. This sprocket wheel 48 through an endless chain 49 is connected to the sprocket 34 fixed to the center hub of the disc 18 such that the chain 49 may be rotated in either direction depending upon the energization of the motor associated therewith.

A third motor (not shown) of the shaded pole, four coil type, provides a rotatable shaft 50 which carries a sprocket wheel 51 which by an endless chain 52 is connected to the sprocket collar 41 fixedly attached to the hollow sleeve 38 of the disc 20. By energization of this motor the disc 20 may be rotated in either direction.

Figure 3:
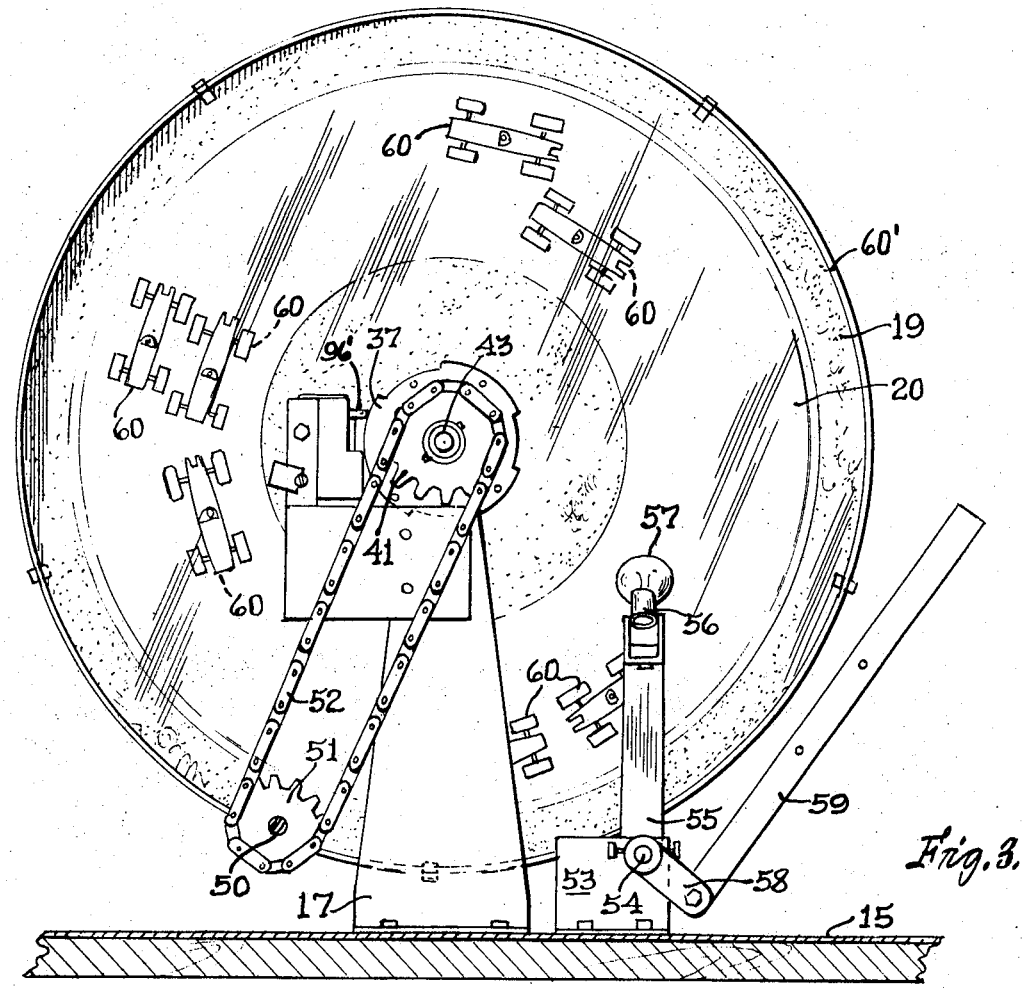
FIG. 3 is a side elevational view opposite to that shown in FIG. 2.

Referring to FIG. 3, there is shown a mounting bracket 53 carried by the base plate 15 which provides a shaft 54 that supports one end of an arm 55 which in turn carries a light socket 56 and light bulb 57. The shaft 54 through a suitable arm linkage 58 and 59 is operatively connected to the steering wheel 12 such that by rotation of the wheel 12 the light 57 will be moved radially across a portion of the face of the disc 20.

The rotatable discs 18, 19 and 20 are each made of a transparent material such that the rays from the light 57 will be projected therethrough and onto a suitable mirror arrangement such that whatever images are made to appear on the discs 18, 19 and 20 will be projected upon the viewing screen 11 in the line of sight of the operator of the apparatus. This reflection arrangement is well-known in the art and for that reason will not be shown or explained in this specification.

It should be noted that each of the discs 18 and 20 are provided with colored transparencies 60 which, when the incandescent rays from the light 57 are refracted onto the screen 11, are projected as vehicle images. The disc 19 includes a peripheral flange 60' designed with colored transparencies to illustrate a panoramic background for a simulated roadway over which the vehicle images of the discs 18 and 20 appear to travel.

Carried by a bracket 61 mounted on the base plate 15 are parallel supporting arms 62 and 63. These arms 62 and 63 have their one ends pivotally connected to the bracket 61 and their opposite ends pivotally connected to a crossbar 64, such that they will move in the manner of a parallelogram.

Mounted across the arms 62 and 63 intermediate their ends are a plurality of styluses 65 which are adapted to move over a printed circuit plate 66. It should be noted that the shaft 54 which carries the light-supporting arm 55 is of such a length as to be journaled through the mounting bracket 61 and forms the pivotal connection for the arm 63 to such bracket 61.

By this arrangement, when the steering wheel 12 is rotated through the linkage arms 58 and 59, the light 57 will be moved radially over the face of the disc 20 while simultaneously with such movement a non-rotatable vehicle figure 67 which is connected to the crossarm 64 of the pivotal parallelogram hereinbefore described, will move radially across the face of the disc 18. This vehicle figure 67 represents the vehicle under the control of the operator of the apparatus and when its image is projected onto the screen 11, it creates the illusion of a driven vehicle under the control of the operator.

Normally when the apparatus is in operation, the discs 18 and 20 through their respective energized motors and sprocket and chain arrangements, will rotate in the same direction about their common axis and the vehicle images will appear to move across the screen 11 from the bottom to the top. The disc 19 through its energized motor will rotate in an opposite direction about the common axis, creating the illusion of movement over a panoramic roadway of the vehicle images 60 as carried by the discs 18 and 20. The image of the operator's vehicle also appears to be moving in the same direction as the vehicles projected off the rotating discs 18 and 20. As the operator depresses the accelerator pedal 13, the speed of rotation of the disc 19 is increased while the speed and direction of rotation of the discs 18 and 20 independently of each other are caused to vary.

To achieve this latter operation, the motors for rotating the discs 18 and 20 are connected to a control mechanism which includes variable resistors hereinafter referred to.

Figure 4:
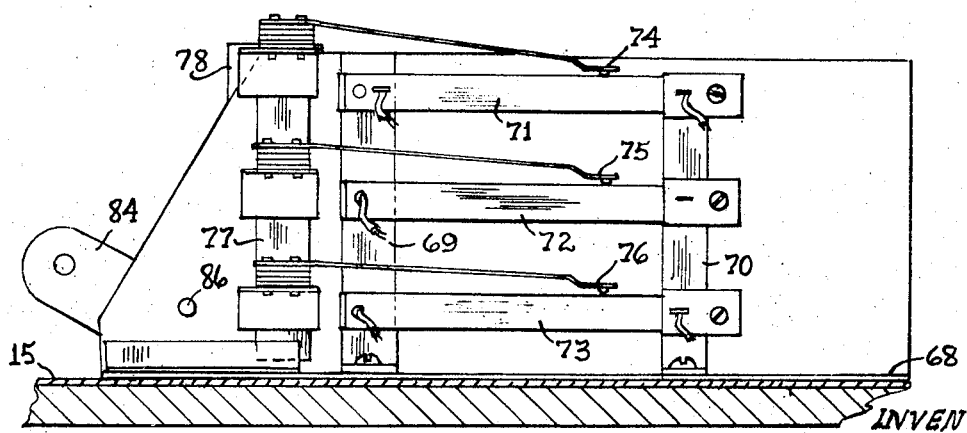
FIG. 4 is a side elevational view of the variable resistor control panel utilized in this invention.

Referring to FIG. 4, we show a mounting plate 68 carried by the base plate 15. By connecting bars 69 and 70 there is mounted thereto a plurality of resistors 71, 72 and 73. Associated with each of these resistors is a separate contact finger 74, 75 and 76, respectively, in turn carried by a movable slide bar 77 connected through a stirrup plate 78 which extends over the top edge of the mounting plate 68 to a pivotal arm hereinafter described.

Figure 5:
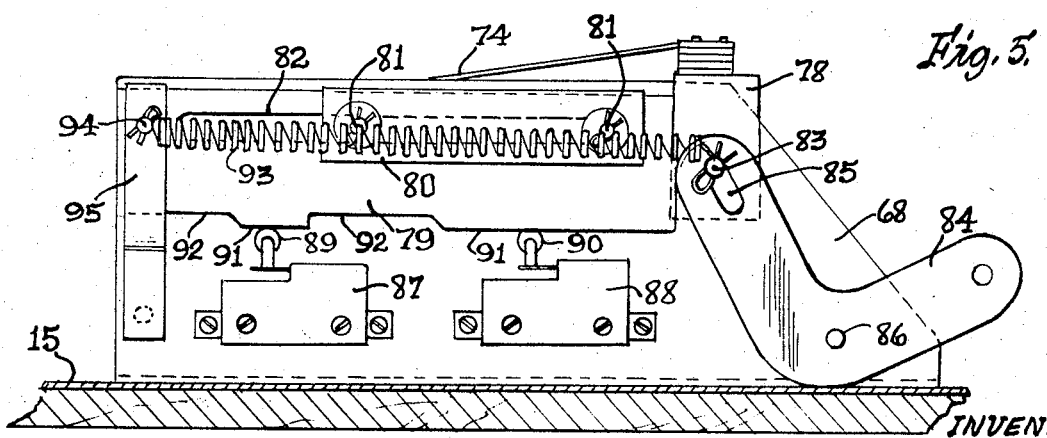
FIG. 5 is an opposite side elevational view of the resistor control panel shown in FIG. 4.

Referring to FIG. 5, we show the opposite side of the mounting plate 68 which has slidably mounted thereon a switch bar 79. This switch bar 79 is positioned between one side wall of the mounting plate 68 and a mounting strip 80 which includes connecting pins 81 that project through a center slot 82 formed in the switch bar 79. One end of the switch bar 79 by a pin 83 is connected to the stirrup plate 78, which has heretofore been described as being connected to the slide bar 77, as well as to one end of an L-shaped toggle arm 84. The pin 83 is captured in a slot 85 formed in one end of the toggle arm 84 in the manner shown in FIG. 5, so as to permit sublinear movement of the slide bar 77 and switch bar 79 when the toggle arm 84 is pivoted as at 86 relative to the plate 68. The toggle arm 84 has its opposite free end through suitable linkage arrangements (not shown) connected to the accelerator pedal 13.

Carried by the plate 68 beneath the switch bar 79 are a plurality of switches 87 and 88. The plungers 89 and 90 of these switches are adapted to ride on shoulders 91 and into notches 92 of the switch bar 79, all for a purpose explained hereinafter.

To maintain the switch bar 79 as well as the slide bar 77 in their original starting position as shown in FIGS. 4 and 5, there is provided a coil spring 93 which extends between a fixed pin 94 on a guide plate 95 which is carried by the mounting plate 68 and the pin 83 which extends through the slot 82 and which connects the switch bar 79 to the toggle arm 84.

The circuit for the electric motors for rotating the discs 18 and 20 includes variable resistors 71 and 73 as well as switches 87 and 88. By this arrangement, the efficiency of the motors is controlled by these resistors so that the speed of rotation of the motor shafts 47 and 50 is manually controlled by the operator. The resistor 72 controls the speed of rotation of the disc 19. The actuation of these variable resistors will control the motors, which in turn controls the rotation of the discs.

The switches 87 and 88 determine the direction of rotation of the discs 18 and 20 by selectively connecting the coils of the electric motors that rotate these discs.

As the accelerator pedal 13 is depressed, the slide bar 77 which carries the contact fingers 74, 75 and 76 will move over their respective resistors 71, 72 and 73 and effectively increase the speed of the associated motors so that the discs 18, 19 and 20 rotate in response thereto.

Simultaneously with the movement of the slide bar 77, the switch bar 79 will also move from left to right as viewed in FIG. 5, so that the plunger 89 of the switch 87 will ride off the shoulder 91 of the switch bar 79, reversing the energization of certain coils of the motor which rotates disc 18, such that the disc now will be rotated in a direction opposite to that of its original rotation. By this direction of rotation, the vehicle images being projected off the disc 18 will now appear to move from the top of the screen 11 to the bottom thereof, creating the illusion of forward movement of the image of the operator's vehicle figure 67.

Additional actuation of the accelerator pedal 13 will move the switch bar 79 until the plunger 90 of the switch 88 rides off its shoulder 91 and into a notch 92, thus effecting the reversing of the shaft of the motor associated with the disc 20. Both the change of direction of rotation of the discs 18 and 20 is accompanied by increased speed of rotation of not only the discs 18 and 20, but also of disc 19, enhancing the illusion of increased forward speed of the operator's vehicle 67. As the illusion of speed is created, the operator must steer his vehicle figure 67 radially across the face of the rotating discs to avoid collision with the images of the other vehicles as projected off the discs 18 and 20. This action by the operator requires skill and coordination.

It should be noted that the color transparencies as mounted on the discs 18 and 20 are correlated to cam surfaces provided by circular cam plates 33 and 37, respectively, of the center hubs of the discs 18 and 20. Suitable switches 96 and 96' (FIGS. 2 and 3) will be effectively actuated by these cam surfaces so as to be in circuit with the printed circuit carried by the plate 66. As heretofore described, the operator's vehicle figure 67 is connected to a plurality of styluses 65 such that through the actuation of the steering wheel 12, not only is the operator's vehicle moved radially over the faces of the rotating discs, but simultaneously the styluses 65 will move responsively over the printed circuit plate 66. Thus, if one of the switches 96 or 96' is actuated by its cam plates 33 or 37 at the same time that the operator's vehicle is positioned in a collision course with the moving vehicle images projected off the discs 18 and 20, the styluses 65 will be on a printed circuit, connected to the switches 96 and 96' and either a signal will be given to the operator of the collision or a score registered or the apparatus will be temporarily deactivated.

Figure 1:
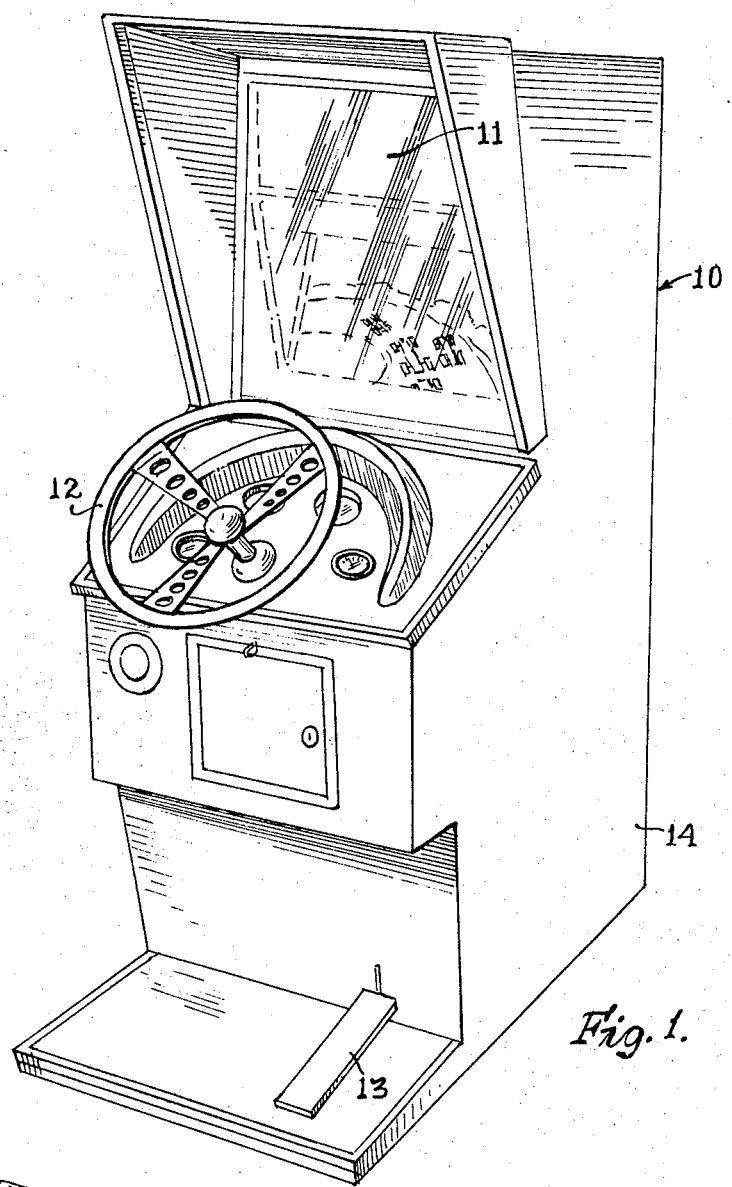
FIG. 1 is a perspective view of the cabinet apparatus.
Figure 7:
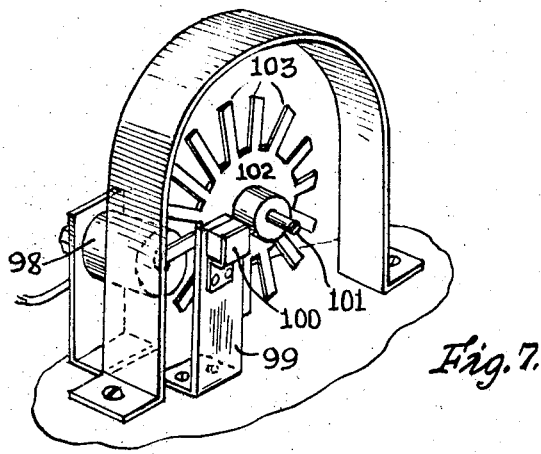
FIG. 7 is a perspective view of an audio-producing device utilized in this invention.

To add realism to the operation of the apparatus there is included an electrical mechanical sound producer. This sound producer is shown in FIG. 7 and comprises an electrical coil 98 having suitable connections to a power source and an amplifier (not shown). Carried by a mounting arm 99 is a permanent magnet 100, spaced from the coil 98 but in the magnetic field thereof.

By a shaft 101 connected to the motor for driving the disc 19, there is provided a rotatable interrupter consisting of a disc 102 having a plurality of radially extending spokes 103 that are adapted to pass through and interrupt the magnetic field extending between the coil 98 and the magnet 100. The impulses created by the interruption of the magnetic field by the spokes 103 are transmitted to and enlarged into audible sounds by the amplifier. The sound resembles that of a racing motor and through the actuation of the resistors as heretofore explained, the speed of operation of the motor that will rotate the disc 19 and the interrupter 102, can be regulated and this in turn will correspondingly reproduce the simulated sound of the motor for the operator's vehicle 67.

Figure 8:
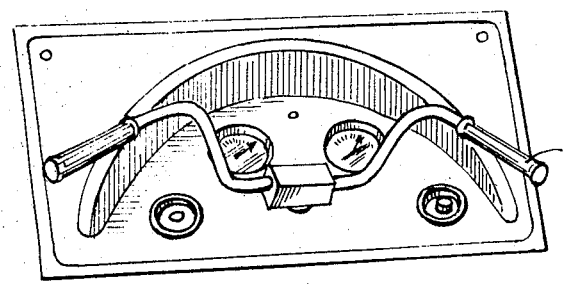
FIG. 8 is a perspective view of a modified steering arrangement for the apparatus.

The movement of the light 57 and the operator's vehicle 67 can be accomplished in any suitable manner such as shown and described in the aforementioned pending patent application. However, in the event that other steering means are to be used, such as the handle bars 115 of a motor cycle as shown in FIG. 8, then a different form of speed and directional control for the discs is necessary.

Figure 9:
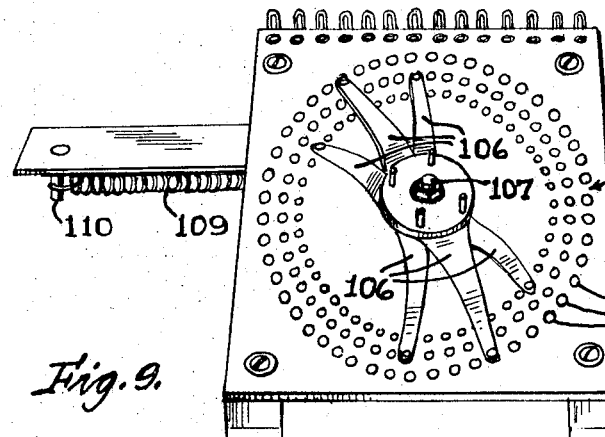
FIG. 9 is a perspective view of the control mechanism associated with FIG. 8.

A proposed form of control for an apparatus which includes a handle bar steering type of control is shown in FIG. 9, wherein there is a circular circuit plate 104 having arranged thereon a plurality of concentric contact buttons 105. By suitable connectors (not shown), these buttons are connected in circuit, which circuit includes resistors to the motor units which drive the discs 18, 19 and 20. Wiper fingers 106 are connected to a rotatable shaft 107 that extends through the plate 104 and are movable therewith over the contact buttons 105.

Figure 10:
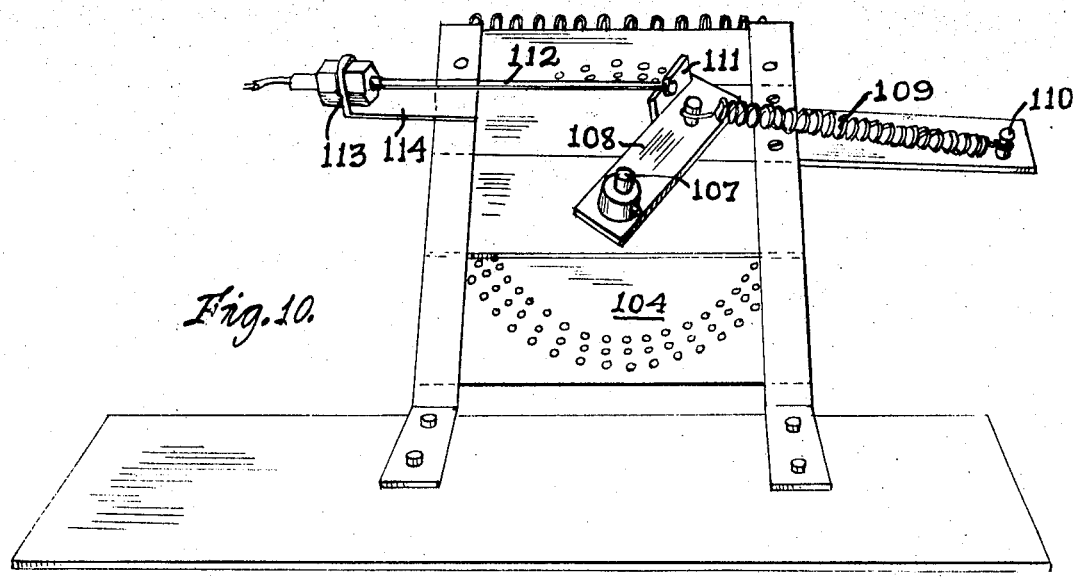
FIG. 10 is a reverse-side perspective view of the control mechanism of FIG. 9.

The rotatable shaft 107 is connected to a bar 108 (FIG. 10) which is normally held in a non-activated position by a spring 109 which extends between one end of the bar 108 and a fixed pin 110. The free end of the bar 108 is in turn by a flange 111 connected to one end of a Bowden cable 112. This cable 112 freely passes through a supporting bushing 113 carried by an arm 114 connected to one of the supporting legs of the plate 104.

Figure 11:
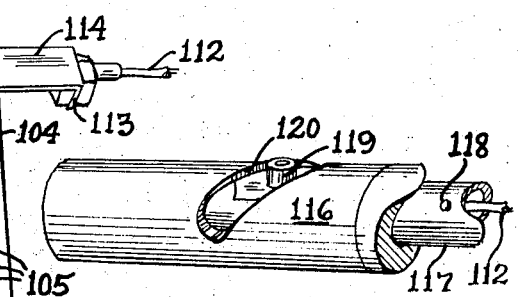
FIG. 11 is a fragmentary detail view of the actuator portion for the control mechanism.

As in normal motor cycle handle bars, the speed control is effected by a rotation of one of the hand grips 115. Within this hand grip 115, as shown in FIG. 11, is a rotatable sleeve 116 which has inserted therein one end of a connecting tube 117, which in turn by a pin 118 is connected to the opposite end of the Bowden cable 112. The tube 117 provides a roller 119 which is adapted to be positioned in and to move through a curved arcuate slot 120 formed in the sleeve 116. By this simple arrangement, when the hand grip 115 is rotated it will cause the pin 118 to move through the slot 120, pulling the tube 117 inwardly of the grip 115 and the Bowden cable 112, against the normal tension of the spring 109, rotating the wiper fingers 106 over the contacts 105. A certain set of each of the contacts 105 may be connected to opposite coils of the electric motors to effect reversing the same to achieve the reverse rotation of the discs 18, 19 and 20 in the manner hereinbefore described and for the purposes hereinbefore set forth.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to protect by Letters Patent is:

1. A simulated driving apparatus including a screen upon which is projected from electric-motor-rotated discs the illusion of a changing panoramic roadway and a plurality of vehicle images moving at varying speeds over the roadway and relative to each other as well as a driven vehicle image under the control of the operator of the apparatus and movable relative to the other vehicle images and the roadway and an electric circuit having components for controlling the operation of the apparatus, wherein the improvement comprises:

(a) plurality of motor-rotated discs provided with transparencies which when projected upon the screen form the images of moving vehicles, (b) means for mounting said plurality of discs for independent rotation about a common axis, (c) means associated with the electric motors for independently rotating said discs in either direction about their common axis, (d) a light source in the circuit of the apparatus movable across the face of said discs for projecting the transparencies off the discs onto the screen of the apparatus, (e) a simulated non-rotatable operator's vehicle connected to but spaced from said light source and movable therewith, with said light source projecting the image of said simulated operator's vehicle upon the screen, (f) means in the circuit of the apparatus for regulating independently the speed of rotation of each of said discs about their common axis, and (g) means in the circuit of the apparatus for independently determining the direction of rotation of each of said discs about their common axis so as to create the illusion of movement between the image of said non-rotatable operator's vehicle and the images of the vehicle transparencies as they are projected upon the screen.

2. A simulated driving apparatus as defined by claim 1 and including a vehicle-motor-simulating noise producer operable in synchronization with the speed of rotation of one of said discs to audibly simulate the sound of moving vehicles.

3. A simulated driving apparatus as defined by claim 1 wherein said means for regulating independently the speed of rotation of each of said discs include a variable resistor in the energizing circuits of the rotating motors for said discs, and resistor controls movable by the operator of the apparatus to control the speed of rotation of said discs.

4. A simulated driving apparatus as defined by claim 1 wherein said means for independently determining the direction of rotation of each of said discs includes switch elements connected in the circuits for the electric motors that rotate said discs, to vary the energization thereof so as to change the direction of rotation of said discs.

5. A simulated driving apparatus as defined by claim 4 wherein said means for regulating independently the speed of rotation of each of said discs include a variable resistor in the energizing circuits of the rotating motors for said discs, and resistor controls movable by the operator of the apparatus to control the speed of rotation of said discs.

6. A simulated driving apparatus as defined by claim 1 wherein said means associated with the electric motors for independently rotating said discs includes chain and sprocket assemblies, with a motor-driven chain and sprocket for each disc so as to independently rotate each disc in either direction.

7. A simulated driving apparatus as defined by claim 6 and including a vehicle-motor-simulating noise producer operable in synchronization with the speed of rotation of one of said discs to audibly simulate the sound of moving vehicles.

8. A simulated driving apparatus as defined by claim 5 wherein said means associated with the electric motors for independently rotating said discs includes chain and sprocket assemblies, with a motor-driven chain and sprocket for each disc so as to independently rotate each disc in either direction.

References Cited

UNITED STATES PATENTS

| | | | |
|---|---|---|---|
| 2,046,202 | 6/1936 | Miles | 35—11 |
| 2,108,726 | 2/1938 | Rocuskie | 272—31 |
| 2,148,828 | 2/1939 | Myers | 35—11X |
| 2,265,598 | 12/1941 | Firestone et al. | 35—11X |
| 3,060,598 | 10/1962 | Gilbert et al. | 35—12L |
| 3,126,670 | 3/1964 | Smith | 35—11X |

WILLIAM H. GRIEB, Primary Examiner

U.S. Cl. X.R.

273—1